United States Patent [19]
Schillo et al.

[11] Patent Number: 5,472,066
[45] Date of Patent: Dec. 5, 1995

[54] ARRESTING BRAKE FOR A WHEELCHAIR

[75] Inventors: Stefan Schillo, Sinsheim; Gerhard Pfisterer, St. Leon-Rot; Waldemar Schiefer, Heidelberg, all of Germany

[73] Assignee: Otto Bock Orthopaedische Industrie Besitz- und Verwaltungs-Kommanditgesellschaft, Duderstadt, Germany

[21] Appl. No.: 251,201

[22] Filed: May 31, 1994

[30] Foreign Application Priority Data

Mar. 25, 1994 [DE] Germany ............................. 9405091 U

[51] Int. Cl.$^6$ ................................. B60T 1/04; A61G 5/00
[52] U.S. Cl. ................................. 188/2 F; 188/74; 188/265
[58] Field of Search .......................... 188/2 F, 74, 265, 188/21, 24.18, 29, 31, 61; 280/250.1, 304.1; 74/489

[56] References Cited

U.S. PATENT DOCUMENTS

| | | | |
|---|---|---|---|
| 4,570,756 | 2/1986 | Minnebraker et al. | 188/2 F |
| 4,691,933 | 9/1987 | Strauss | 188/2 F X |
| 5,355,977 | 10/1994 | Küschall | 188/2 F |

FOREIGN PATENT DOCUMENTS 0204040  12/1986  European Pat. Off. ............... 188/2 F Primary Examiner—Douglas C. Butler
Attorney, Agent, or Firm—Foley & Lardner

[57] ABSTRACT

The invention relates to an arresting brake for a wheelchair, having a braking element which is articulated pivotably on a retaining element and, by pivoting a hand brake lever, can be pivoted into an arresting position in which the braking element bears, under pressure, on a wheelchair wheel or its tire. In order to provide a versatile arresting brake for wheelchairs, the invention proposes that the hand brake lever also be mounted on the retaining element, which is pivotably suspended on an adaptor which exhibits fastening device, for fixing it on the wheelchair frame, and a pivot pin which is located in the longitudinal direction of the wheelchair when the adaptor is mounted and about which the retaining element can be pivoted out of a positive locking catch position, which defines the braking function position, into a storage (rest) position located within the outer contour of the wheelchair.

19 Claims, 5 Drawing Sheets

ARRESTING BRAKE FOR A WHEELCHAIR

BACKGROUND OF THE INVENTION

1. Field of the Invention

The invention relates to an arresting brake for a wheelchair, having a braking element which is articulated pivotally on a retaining element. By pivoting a hand brake lever, the arresting brake can be pivoted into a braking (arresting) position in which the braking element is pressed, under pressure, against a wheelchair wheel or its tire.

2. Description of the Related Art

In sports played by handicapped people, specially designed sports wheelchairs are often used. These sports wheelchairs differ from conventional wheelchairs in that they exhibit a rigid frame structure and have no arresting brake. A brake is not used because it constitutes a risk of injury for fellow players when playing team sports. It is often desirable, however, to use the sports wheelchair for conventional non-sporting use due to its stability.

SUMMARY OF THE INVENTION

One object of the invention is to develop a versatile arresting brake for wheelchairs.

Another object of the present invention is to provide an arresting brake which, when playing a sport, can be pivoted inward by means of a handle to a storage or rest position, thus eliminating the risk of injury.

Still another object of the present invention is to provide an arresting brake which can be pivoted inward to a storage position so that the wheelchair can pass through narrow areas that are present in airplanes, trains, and doorways.

In accomplishing the foregoing objectives, there has been provided according to the present invention an arresting brake for a wheelchair, which includes: (i) a retaining element; (ii) a braking element for applying a braking pressure against a tire or wheel of said wheelchair, and is articulated pivotally on the retaining element; (iii) a hand brake lever mounted on the retaining element, which provides for the articulated pivoting of the braking element; (iv) an adaptor; (v) fastening means for fixing the adaptor to a wheelchair frame; (vi) a pivot pin which extends in the longitudinal direction of the wheelchair when the adaptor is fixed to the wheelchair frame, and can pivotally suspend the retaining element on the adaptor; (vii) a first positive locking catch having a first positive locking catch position for locking the arresting brake in a braking function position; and (viii) a storage (rest) position for locating the brake within the confines of the wheelchair. The retaining element can be pivoted by said pivot pin out of the first positive locking catch position and into the storage position.

In a preferred embodiment the storage position is also a positive locking catch position, and the two positive locking catch positions are offset with respect to each other by a pivot angle of approximately 180°.

In another preferred embodiment the positive locking catch includes a catching element on the retaining element which engages a form-fitting corresponding catching element on the adaptor.

In still another preferred embodiment, the catching element includes a catching lug, and the form-fitting corresponding element includes a corresponding wedge-shaped groove.

Further objects, features, and advantages of the present invention will become apparent from the detailed description of the preferred embodiments which follows.

DETAILED DESCRIPTION OF THE PREFERRED EMBODIMENTS

The present invention comprises a hand brake lever mounted on a retaining element, which is pivotally suspended on an adaptor which has fastening means, for fixing it on the wheelchair frame. A pivot pin for pivoting the retaining element is located in the longitudinal direction of the wheelchair when the adaptor is mounted. The retaining element can be pivoted out of a positive locking catch position, which defines the braking function position, into a storage (rest) position located within the confines of the wheelchair.

In order to ensure that the arresting brake is secured in its pivoted-in position, the invention further provides a second positive locking catch position which defines the storage position. In order to achieve a functionally reliable and virtually maintenance-free arresting brake, it is advantageous if the retaining element can be displaced in the axial direction of the pivot pin in the opposite direction to the action of a resilient element. The action of the resilient element draws the retaining element with a catching element into the positive locking catch position. The axial displacement moves the retaining element into a pivotable position which disengages the retaining element from the positive locking catch position. In this arrangement, it is further advantageous if the resilient element is a compression spring which surrounds the pivot pin and is supported, by one end, on one leg of the retaining element and, by its other end, on a shoulder of the adaptor.

The arresting brake is preferably configured as a toggle joint brake, the dead center position of which is located in the braking end position of the hand brake lever.

Figure 1:
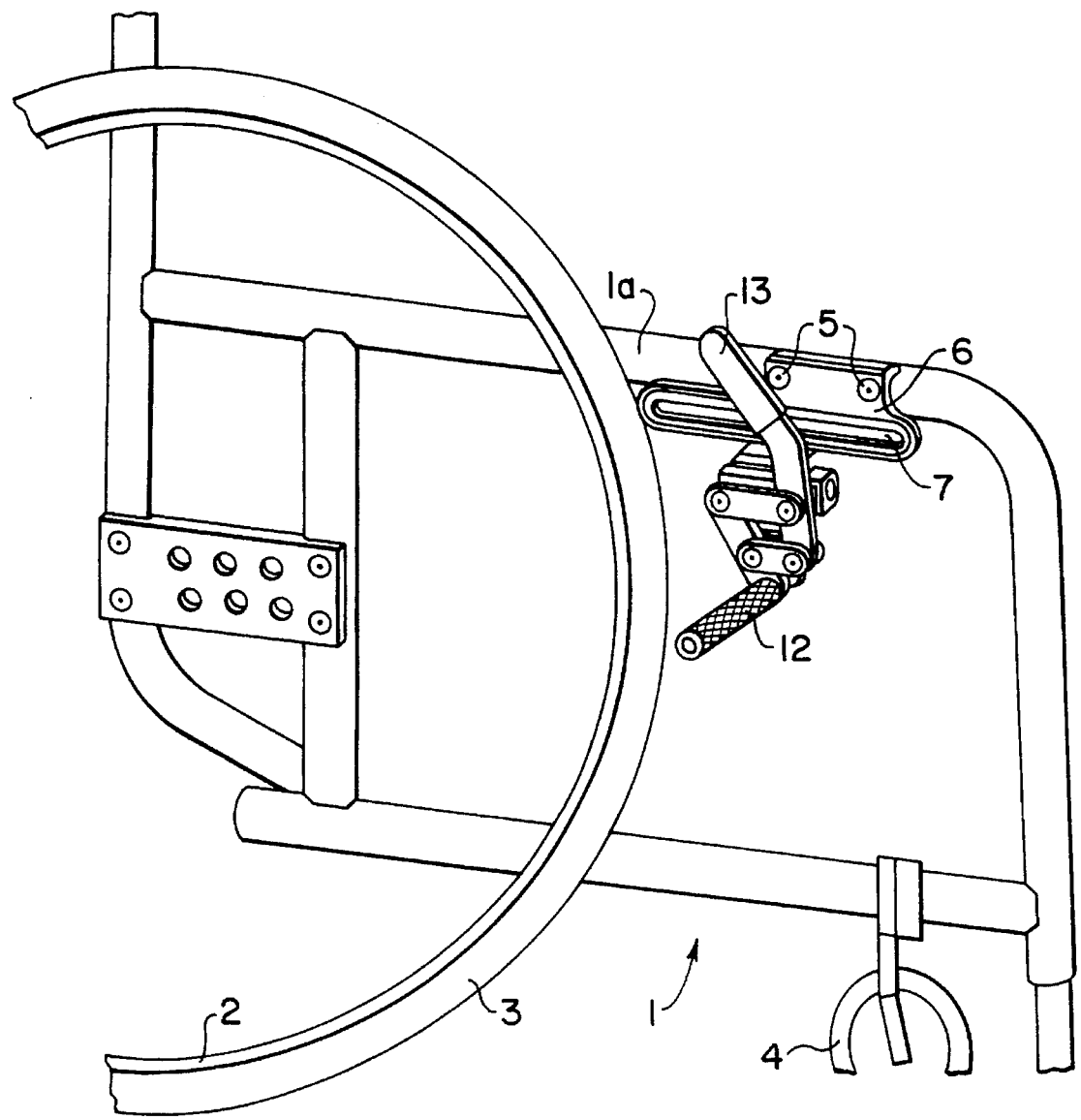
FIG. 1 shows, in schematic representation, a side view of a wheelchair with an arresting brake mounted thereon.

FIG. 1 shows, a schematic side view of a wheelchair, which includes a wheelchair frame 1, a large wheelchair wheel 2 with tire 3, and a smaller steerable wheel 4.

An arresting brake configured as a toggle joint brake is fastened on an upper tube 1a of the wheelchair frame 1. To fasten the brake, a mounting bracket 6 is screw-connected to the frame tube 1a, with the aid of two screws 5. The mounting bracket 6 includes an adjusting slot 7 which runs in the longitudinal direction of the wheelchair. Screws 8 extend through the slot 7 to fasten an adaptor 9 to the bracket 6. The adaptor is represented as an individual part in FIG. 5.

Pivotally mounted on the adaptor 9 is a retaining element 10 which includes an articulated lever 11. The lever 11 carries, at its lower end, a braking element 12 which, by pivoting a hand brake lever 13, can be pivoted into an arresting or braking position in which the braking element 12 is pressed against the wheelchair wheel 2 or its tire 3.

Figure 3:
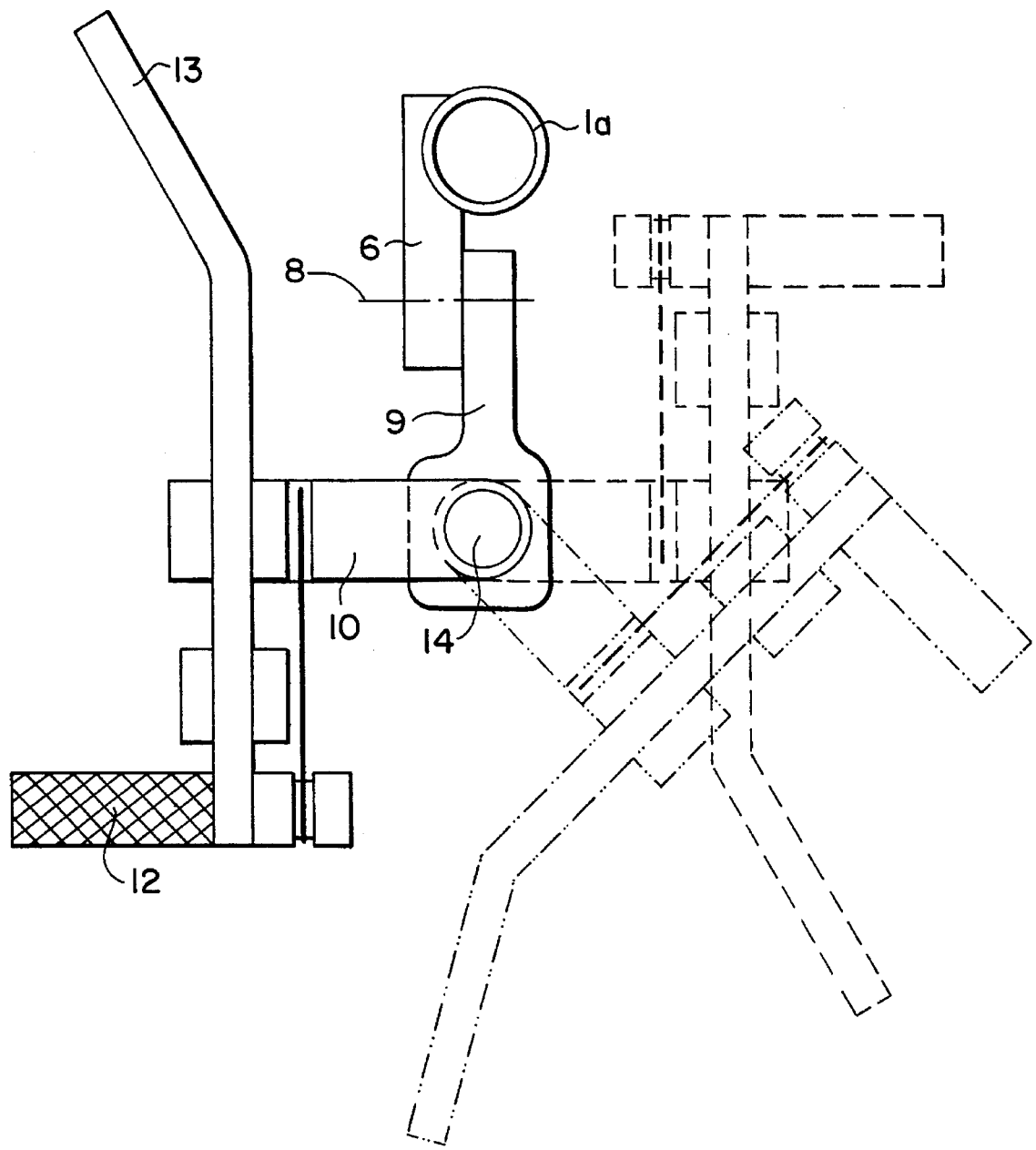
FIG. 3 shows an end view of the arresting brake. The brake is in its braking function position according to FIG. 1 in solid lines, in a position pivoted in through 140° in chain-dotted lines, and in a storage (rest) position pivoted in through 180° in dotted lines.

While the lever 11 is pivoted about a pin arranged transversely to the wheelchair, the retaining element 10 can pivot with respect to the adaptor 9 by way of pivot pin 14 as shown in FIG. 3. The pin 14 is located, with the arresting brake mounted, in the longitudinal direction of the wheelchair and is preferably parallel to the above-mentioned adjusting slot 7.

Figure 2:
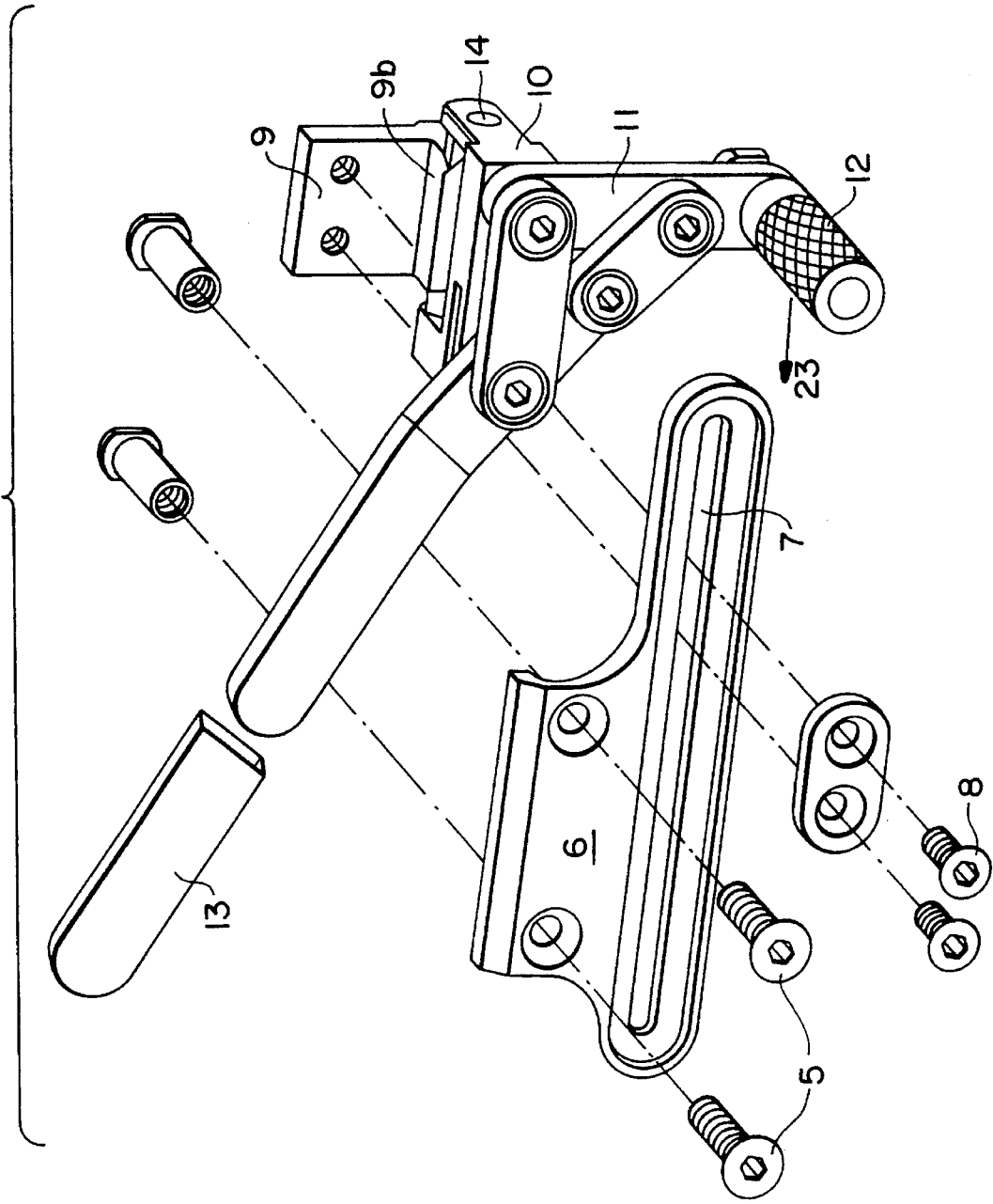
FIG. 2 shows, in an exploded representation, the arresting brake according to FIG. 1.
Figure 4:
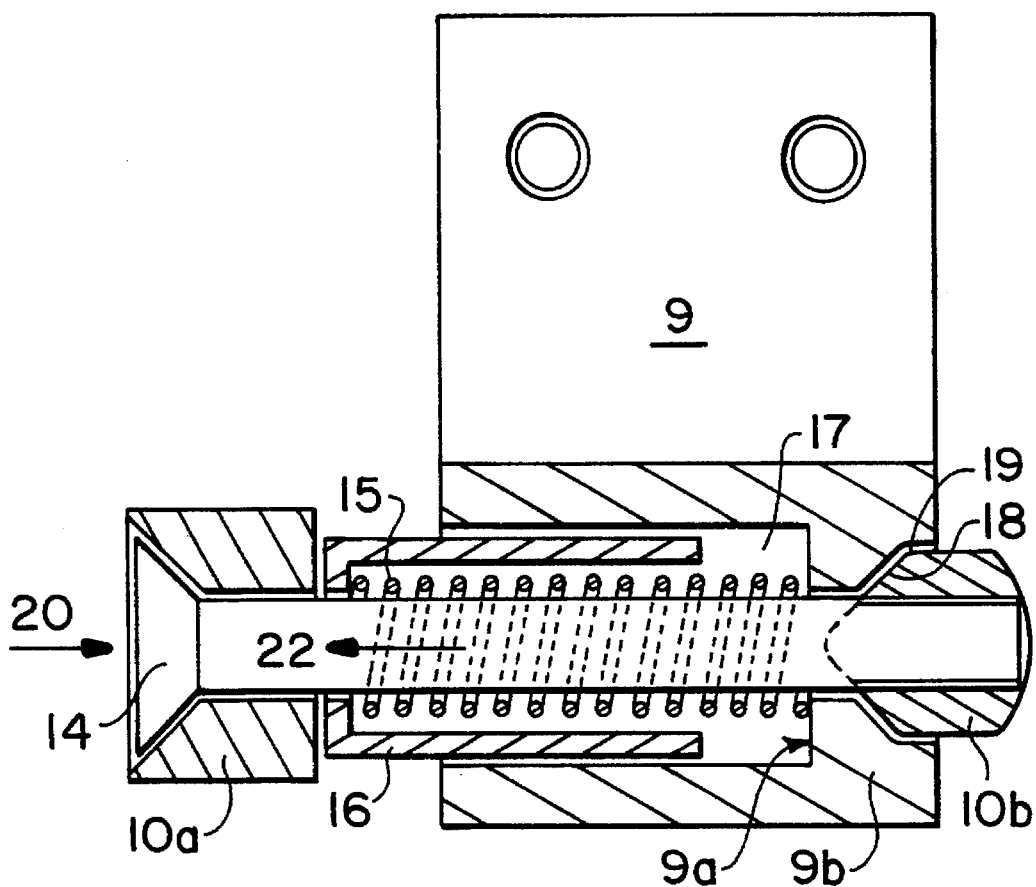
FIG. 4 shows a cross-section through two components of the arresting brake which are pivotally connected to one another.

The pivot pin 14 is preferably configured as a screw and is fastened on two U-legs 10a, 10b (FIG. 4) of the retaining element 10, which has an approximately U-shaped cross-sectional configuration as shown in FIG. 2. Surrounding the pivot pin 14 is a compression spring 15 which is supported, by one end, on one leg 10a of the retaining element 10 and, by its other leg, on a shoulder 9a of the adaptor 9. As shown in FIG. 4 a sleeve-shaped bushing 16 engages over the compression spring 15, and can be axially inserted into a corresponding cutout 17 in the lower, virtually horizontal running leg 9b of the angled adaptor 9. Due to this configuration, the retaining element 10 can be axially displaced in the direction of its pivot pin 14, in the opposite direction to the action of the compression spring 15, into a pivotable position which disengages the retaining element from a positive locking catch position.

As shown in FIG. 1, the braking function position of the retaining element 10 (which is also represented in solid lines in FIG. 3) is defined by a first positive locking catch which is defined by a cross-sectionally wedge-shaped catching lug 18 (FIG. 4), provided on the retaining element 10, and a corresponding wedge-shaped groove 19 (FIGS. 4 and 5) which is provided in the lower leg 9b of the adaptor 9 and is adopted to retain catching lug 18. In the positive locking catch position represented in FIG. 4, the compression spring 15 draws the retaining element 10 with its catching lug 18 into the groove 19 of the adaptor.

In particular, FIG. 4 also makes it clear that by applying a compressive force on the retaining element 10 in the direction of the arrow 20, the retaining element 10 is axially displaced and consequently disengaged from its positive locking catch position. The axial displacement displaces the retaining element 10 into a pivotable position. The retaining element 10 can then be pivoted, about the pivot pin 14, into a storage position located within the confines of the wheelchair. FIG. 3 illustrates the two pivot positions provided: the innermost pivot (storage) position is achieved by a pivoted-in angle of approximately 180°. The innermost pivot position is defined by a second positive locking catch position, which is defined likewise by the above-mentioned groove 19 which is provided in the lower leg 9b of the adaptor 9 and into which the catching lug 18 engages once again after pivoting through 180°.

Figure 5:
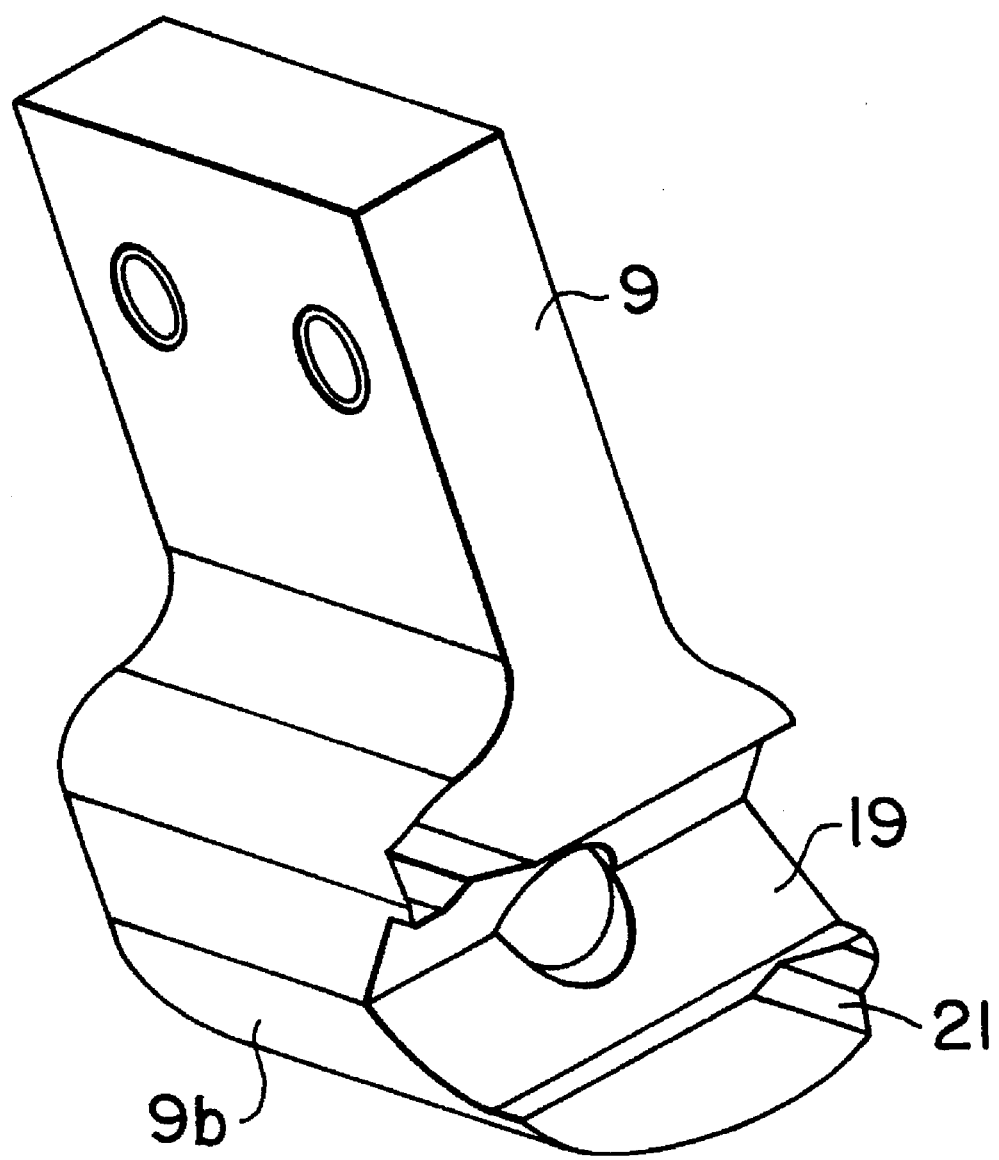
FIG. 5 shows, in diagrammatic representation, one of the two components represented in FIG. 4.

FIG. 3 also shows, in chain-dotted lines, a central intermediate pivot position for the retaining element 10, which position is achieved by a pivoted-in angle of approximately 140°. In this pivot position, the pivoted-in arresting brake is held in the intermediate position only by friction, or at most by a slight form fit between adaptor 9 and retaining element 10. In this position, only a small amount of force is necessary to apply to retaining element 10, so that the arresting brake can be quickly pivoted back into the position in which it performs the braking function. As shown in FIG. 5, the slight form fit may be provided in the lower leg 9b of the adaptor 9, as a second groove 21 which is intended to engage the catching lug 18. However, the groove 21 exhibits a considerably smaller depth than the first groove 19, thus requiring less force to disengage.

FIG. 2 shows the arresting brake and its hand brake lever 13 in the braking function position. In the braking function position, the braking element 12 is pressed, under pressure, against the wheelchair wheel 2 with its tire 3 which are represented in FIG. 1. In order to ensure that this brake pressure is not capable of disengaging the form fit between the adaptor 9 and retaining element 10, which fixes the brake and its retaining element 10 in the braking function position, the structure is configured such that the force vector 22 of the compression spring 15 points in the same direction as the force vector 23 of the reaction force acting on the braking element 12 in the braking function position (see FIGS. 2 and 4).

The arresting brake, which can be pivoted away according to the present invention, in combination with so-called transit rollers, offers a further application area. The passageways in an airplane or train are often so narrow that the overall width of the wheelchair does not permit the wheelchair to pass through. This is also true with doors to toilets or bathrooms. By using plugged-in transit rollers, the drive wheels can be removed. The result is that the overall width of the wheelchair is considerably reduced. The outermost point projecting beyond the side contour of the wheelchair is then formed by the braking element, configured in the form of a bolt, of the arresting brake. When using the arresting brake which can be pivoted away according to the present invention, the overall width of the wheelchair is reduced further. At the same time, the risk of getting caught on airplane or train seats, or in a door frame is also reduced.

The configuration according to the present invention makes it possible to mount the arresting brake on any conventionally available wheelchair.

The foregoing description of the preferred embodiments should be taken by way of illustration rather than by way of limitation of the present invention as defined by the claims set forth below.

What is claimed is:

1. An arresting brake for a wheelchair, comprising:

a retaining element;

a braking element for applying a braking pressure against a tire or wheel of said wheelchair, said braking element being articulated pivotally on said retaining element to engage said braking element with said tire or wheel;

a hand brake lever mounted on said retaining element, said hand brake lever providing said articulated pivoting of said braking element;

an adaptor;

fastening means for fixing said adaptor to a wheelchair frame;

a pivot pin extending in the longitudinal direction of the wheelchair when said adaptor is fixed to said wheelchair frame, said pivot pin pivotally suspending said retaining element, said braking element and said hand brake lever on said adaptor;

a first positive locking catch having a first positive locking catch position for locking said arresting brake in a braking function position; and a storage position for locating said arresting brake within the confines of said wheelchair, whereby said retaining element, with said braking element and said hand lever mounted thereon, can be pivoted by said pivot pin out of said first positive locking position and into said storage position.

2. The arresting brake as claimed in claim 1, wherein said storage position further comprises a second positive locking catch position.

3. The arresting brake as claimed in claim 2, wherein the first and second positive locking catch positions are offset with respect to one another by a pivot angle of approximately 180°.

4. The arresting brake as claimed in claim 2, further comprising an intermediate frictionally locking catch position which is arranged between the first and second positive locking catch positions at a pivot angle of approximately 140°.

5. The arresting brake as claimed in claim 1 wherein the first positive locking catch further comprises a catching element on said retaining element, which engages a form-fitting corresponding catching element on said adaptor.

6. The arresting brake as claimed in claim 5, further comprising a resilient element which urges said catching element into said form fit with said corresponding catching element, wherein said retaining element is further displaceable in the axial direction of said pivot pin and in the opposite direction to the urging direction of said resilient element, and wherein said retaining element displacement moves the retaining element in a pivotable position and disengages said catching element and said corresponding catching element from said form fit.

7. The arresting brake as claimed in claim 6, wherein the retaining element has an approximately U-shaped cross-section, and wherein the pivot pin is a screw retained on the two U-legs of said retaining element.

8. The arresting brake as claimed in claim 7, wherein the resilient element comprises a compression spring which surrounds the pivot pin and is supported, by one end, on one leg of the retaining element and, by its other end, on a shoulder of the adaptor.

9. The arresting brake as claimed in claim 6, wherein the resilient element has a force vector extending in the same direction as the force vector of the reaction force acting on the braking element when the braking element is pressed against the tire or wheel.

10. The arresting brake as claimed in claim 1, wherein the first positive locking catch further comprises a cross-sectionally wedge-shaped catching lug on said retaining element which engagingly fits into a corresponding wedge-shaped groove on said adaptor.

11. The arresting brake as claimed in claim 1, wherein said arresting brake comprises a toggle joint brake.

12. A combination wheelchair and arresting brake, comprising:

a wheelchair;

and an arresting brake for said wheelchair, said arresting brake comprising:

a retaining element;

a braking element for applying a braking pressure against a tire or wheel of said wheelchair, said braking element being articulated pivotally on said retaining element to engage said braking element with said tire or wheel;

a hand brake lever mounted on said retaining element, said hand brake lever providing said articulated pivoting of said braking element;

an adaptor;

fastening means for fixing said adaptor to a wheelchair frame;

a pivot pin extending in the longitudinal direction of the wheelchair when said adaptor is fixed to said wheelchair frame, said pivot pin pivotally suspending said retaining element, said braking element and said hand brake lever on said adaptor;

a first positive locking catch having a first positive locking catch position for locking said arresting brake in a braking function position; and a storage position for locating said arresting brake within the confines of said wheelchair, whereby said retaining element, with said braking element and said hand lever mounted thereon, can be pivoted by said pivot pin out of said first positive locking position and into said storage position.

13. An arresting brake adapted for a wheelchair, comprising:

a retaining element;

a braking element for applying a braking pressure against a tire or wheel of said wheelchair, said braking element being articulated pivotally on said retaining element to engage said braking element with said tire or wheel;

a hand brake lever mounted on said retaining element, said hand brake lever providing said articulated pivoting of said braking element;

an adaptor;

fastening means for fixing said adaptor to a wheelchair frame;

a pivot pin extending in the longitudinal direction of the wheelchair when said adaptor is fixed to said wheelchair frame, said pivot pin pivotally suspending said retaining element on said adaptor;

a first positive locking catch having a first positive locking catch position for locking said arresting brake in a braking function position, said first positive locking catch including a catching element positioned on said retaining element, and a form-fitting corresponding catching element on said adaptor, wherein said catching element engages said form-fitting corresponding catching element when said arresting brake is in said first positive locking catch position;

a resilient element for urging said catching element into engagement with said form-fitting corresponding catching element, wherein said retaining element is displaceable in the axial direction of said pivot pin and in the opposite direction to the urging direction of said resilient element, and wherein said retaining element displacement moves the retaining element in a pivotable position and disengages said catching element and said corresponding catching element from said engagement; and a storage position for locating said arresting brake within the confines of said wheelchair, whereby said retaining element can be pivoted by said pivot pin out of said first positive locking position and into said storage position.

14. The arresting brake as claimed in claim 13, wherein said catching element positioned on said retaining element comprises a cross-sectionally wedge-shaped catching lug and wherein said form-fitting corresponding catching element on said adaptor comprises a corresponding wedge shaped groove, and whereby said catching lug engagingly fits into said corresponding wedge-shaped groove on said adaptor when said arresting brake is in said first positive locking catch position.

15. The arresting brake as claimed in claim 13, wherein said retaining element has an approximately U-shaped cross-section, and wherein the pivot pin is a screw retained on the two U-legs of said retaining element.

16. The arresting brake as claimed in claim 15, wherein the resilient element comprises a compression spring which surrounds the pivot pin and is supported, by one end, on one leg of the retaining element and, by its other end, on a shoulder of the adaptor.

17. The arresting brake as claimed in claim 13, wherein said arresting brake comprises a toggle joint brake.

18. The arresting brake as claimed in claim 13, wherein the resilient element has a force vector extending in the same direction as the force vector of the reaction force acting on the braking element when the braking element is pressed against the tire or wheel.

19. A combination wheelchair and arresting brake, comprising:

a wheelchair; and an arresting brake for said wheelchair, said arresting brake comprising, a retaining element;

a braking element for applying a braking pressure against a tire or wheel of said wheelchair, said braking element being articulated pivotally on said retaining element to engage said braking element with said tire or wheel;

a hand brake lever mounted on said retaining element, said hand brake lever providing said articulated pivoting of said braking element;

an adaptor;

fastening means for fixing said adaptor to a wheelchair frame;

a pivot pin extending in the longitudinal direction of the wheelchair when said adaptor is fixed to said wheelchair frame, said pivot pin pivotally suspending said retaining element on said adaptor;

a first positive locking catch having a first positive locking catch position for locking said arresting brake in a braking function position, said first positive locking catch including a catching element positioned on said retaining element, and a form-fitting corresponding catching element on said adaptor, wherein said catching element engages said form-fitting corresponding catching element when said arresting brake is in said first positive locking catch position;

a resilient element for urging said catching element into engagement with said form-fitting corresponding catching element, wherein said retaining element is displaceable in the axial direction of said pivot pin and in the opposite direction to the urging direction of said resilient element, and wherein said retaining element displacement moves the retaining element in a pivotable position and disengages said catching element and said corresponding catching element from said engagement; and a storage position for locating said arresting brake within the confines of said wheelchair, whereby said retaining element can be pivoted by said pivot pin out of said first positive locking position and into said storage position.

\* \* \* \* \*